(12) United States Patent
Billingsley et al.

(10) Patent No.: US 8,535,406 B2
(45) Date of Patent: Sep. 17, 2013

(54) FILTER ELEMENT UTILIZING SHAPED PARTICLE-CONTAINING NONWOVEN WEB

(75) Inventors: Britton G. Billingsley, St. Paul, MN (US); Marvin E. Jones, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 326 days.

(21) Appl. No.: 13/133,188

(22) PCT Filed: Dec. 3, 2009

(86) PCT No.: PCT/US2009/066494
§ 371 (c)(1),
(2), (4) Date: Jun. 7, 2011

(87) PCT Pub. No.: WO2010/080251
PCT Pub. Date: Jul. 15, 2010

(65) Prior Publication Data
US 2011/0240029 A1    Oct. 6, 2011

Related U.S. Application Data

(60) Provisional application No. 61/138,750, filed on Dec. 18, 2008.

(51) Int. Cl.
*A62B 23/02* (2006.01)
*B01D 53/04* (2006.01)

(52) U.S. Cl.
USPC .......... 55/529; 55/DIG. 35; 96/153; 442/417; 128/205.27

(58) Field of Classification Search
USPC ............. 55/524, 527–529, DIG. 33, DIG. 35; 96/153, 154; 442/121, 122, 417; 128/201.22, 128/205.12, 205.27; 210/502.1
See application file for complete search history.

(56) References Cited

U.S. PATENT DOCUMENTS

| | | |
|---|---|---|
| 3,645,072 A | 2/1972 | Clapham |
| 3,687,297 A | 8/1972 | Kuhn et al. |
| 3,721,072 A | 3/1973 | Clapham |
| 3,783,085 A | 1/1974 | Pearson |
| 3,919,369 A | 11/1975 | Holden |
| 3,925,248 A | 12/1975 | Moroni et al. |
| 3,971,373 A | 7/1976 | Braun |
| 4,103,058 A | 7/1978 | Humlicek |
| 4,113,817 A | 9/1978 | Kroger et al. |
| 4,131,544 A | 12/1978 | Elahi |
| 4,153,505 A | 5/1979 | Ferguson |
| 4,217,386 A | 8/1980 | Arons et al. |

(Continued)

FOREIGN PATENT DOCUMENTS

| | | |
|---|---|---|
| GB | 2113731 A | 8/1983 |
| WO | WO 81/01019 | 4/1981 |
| WO | WO 2005/118108 A1 | 12/2005 |
| WO | WO 2006/052694 A1 | 5/2006 |

OTHER PUBLICATIONS

International Application No. PCT/US2009/066494 Search Report dated Feb. 8, 2010.

*Primary Examiner* — Frank Lawrence, Jr.
(74) *Attorney, Agent, or Firm* — Karl G. Hanson

(57) ABSTRACT

A filter element utilizes a porous shape-retaining self-supporting non-woven web. The web includes thermoplastic elastomeric polymer fibers and active particles disposed in the fibers. The web also possesses a three-dimensional deformation.

17 Claims, 7 Drawing Sheets

(56) References Cited

U.S. PATENT DOCUMENTS

| | | | |
|---|---|---|---|
| 4,220,553 A | 9/1980 | Krause | |
| 4,358,396 A | 11/1982 | Bernstein et al. | |
| 4,373,519 A | 2/1983 | Errede et al. | |
| 4,399,052 A | 8/1983 | Sugino | |
| 4,429,001 A | 1/1984 | Kolpin et al. | |
| 4,518,704 A | 5/1985 | Okabayashi et al. | |
| 4,664,683 A | 5/1987 | Degen et al. | |
| 4,729,371 A | 3/1988 | Krueger | |
| 4,797,318 A | 1/1989 | Brooker et al. | |
| 4,807,619 A | 2/1989 | Dyrud et al. | |
| 4,868,032 A | 9/1989 | Eian et al. | |
| 4,883,052 A | 11/1989 | Weiss et al. | |
| 4,992,084 A * | 2/1991 | Von Blucher et al. | 96/131 |
| 5,033,465 A | 7/1991 | Braun et al. | |
| 5,078,132 A | 1/1992 | Braun et al. | |
| 5,129,929 A | 7/1992 | Linnersten | |
| 5,180,622 A * | 1/1993 | Berg et al. | 428/192 |
| 5,248,428 A | 9/1993 | Hagen et al. | |
| 5,256,476 A | 10/1993 | Tanaka et al. | |
| 5,328,758 A | 7/1994 | Markell et al. | |
| 5,332,426 A | 7/1994 | Tang et al. | |
| 5,338,340 A | 8/1994 | Kasmark, Jr. et al. | |
| 5,350,443 A | 9/1994 | von Blucher et al. | |
| 5,415,779 A | 5/1995 | Markell et al. | |
| 5,486,410 A * | 1/1996 | Groeger et al. | 442/353 |
| 5,510,063 A | 4/1996 | Gadkaree et al. | |
| 5,560,878 A | 10/1996 | Dragoo et al. | |
| 5,595,649 A | 1/1997 | Markell et al. | |
| 5,662,728 A * | 9/1997 | Groeger | 96/153 |
| 5,665,148 A | 9/1997 | Muhlfeld et al. | |
| 5,696,199 A | 12/1997 | Senkus et al. | |
| 5,738,790 A | 4/1998 | Hagen et al. | |
| 5,952,420 A | 9/1999 | Senkus et al. | |
| 5,997,618 A | 12/1999 | Schneider et al. | |
| 6,024,782 A | 2/2000 | Freund et al. | |
| 6,077,335 A | 6/2000 | Schneider et al. | |
| 6,077,588 A | 6/2000 | Koslow et al. | |
| 6,083,439 A | 7/2000 | Nastke et al. | |
| 6,102,039 A | 8/2000 | Springett et al. | |
| 6,168,681 B1 | 1/2001 | Bellefeuille et al. | |
| 6,200,368 B1 | 3/2001 | Guerin et al. | |
| 6,207,251 B1 | 3/2001 | Balsimo et al. | |
| 6,228,152 B1 | 5/2001 | Guerin et al. | |
| 6,234,171 B1 | 5/2001 | Springett et al. | |
| 6,273,938 B1 | 8/2001 | Fanselow et al. | |
| 6,277,178 B1 | 8/2001 | Holmquist-Brown et al. | |
| 6,277,179 B1 | 8/2001 | Reymonet | |
| 6,280,824 B1 | 8/2001 | Insley et al. | |
| 6,302,946 B1 | 10/2001 | Cronia et al. | |
| 6,352,578 B1 | 3/2002 | Sakata et al. | |
| 6,379,438 B1 | 4/2002 | Schneider et al. | |
| 6,391,429 B1 | 5/2002 | Senkus et al. | |
| 6,413,303 B2 | 7/2002 | Gelderland et al. | |
| 6,429,165 B1 | 8/2002 | Nastke et al. | |
| 6,451,723 B1 | 9/2002 | Gaita et al. | |
| 6,485,546 B2 | 11/2002 | Fuchs | |
| 6,589,317 B2 | 7/2003 | Zhang et al. | |
| 6,652,629 B2 | 11/2003 | Wolff et al. | |
| 6,703,072 B2 | 3/2004 | Fu et al. | |
| 6,752,889 B2 | 6/2004 | Insley et al. | |
| 6,793,866 B2 | 9/2004 | Kelly et al. | |
| 6,840,986 B1 | 1/2005 | Koslow | |
| 6,878,193 B2 | 4/2005 | Kasmark, Jr. | |
| 6,986,804 B2 | 1/2006 | Dominiak et al. | |
| 7,022,158 B2 | 4/2006 | Seguin et al. | |
| 7,029,516 B2 | 4/2006 | Campbell et al. | |
| 7,037,642 B2 | 5/2006 | Hei | |
| 7,037,865 B1 | 5/2006 | Kimberly | |
| 7,077,891 B2 | 7/2006 | Jaffe et al. | |
| 7,112,272 B2 | 9/2006 | Hughes et al. | |
| 7,112,280 B2 | 9/2006 | Hughes et al. | |
| 7,419,526 B2 * | 9/2008 | Greer et al. | 55/512 |
| 8,460,423 B2 * | 6/2013 | Legare et al. | 55/486 |
| 2001/0029843 A1 | 10/2001 | Minoru et al. | |
| 2001/0045398 A1 | 11/2001 | Messier | |
| 2002/0000229 A1 | 1/2002 | Becker et al. | |
| 2002/0069761 A1 | 6/2002 | Fuchs | |
| 2002/0166450 A1 | 11/2002 | Kishkovich et al. | |
| 2003/0041733 A1 | 3/2003 | Seguin et al. | |
| 2003/0089092 A1 | 5/2003 | Bause et al. | |
| 2003/0089236 A1 | 5/2003 | Zhang et al. | |
| 2003/0118781 A1 | 6/2003 | Insley et al. | |
| 2003/0177909 A1 | 9/2003 | Koslow | |
| 2003/0183083 A1 | 10/2003 | Hau-Cheng Fu et al. | |
| 2003/0224932 A1 | 12/2003 | Saaski et al. | |
| 2005/0079379 A1 | 4/2005 | Wadsworth et al. | |
| 2005/0169820 A1 | 8/2005 | Tatarchuk et al. | |
| 2005/0221089 A1 | 10/2005 | Reid et al. | |
| 2006/0096910 A1 | 5/2006 | Brownstein et al. | |
| 2006/0096911 A1 | 5/2006 | Brey et al. | |
| 2006/0166818 A1 | 7/2006 | Powers et al. | |
| 2006/0166819 A1 | 7/2006 | Powers et al. | |
| 2006/0254427 A1 | 11/2006 | Trend et al. | |
| 2007/0062862 A1 | 3/2007 | Hughes et al. | |
| 2007/0096372 A1 | 5/2007 | Qinhua et al. | |

* cited by examiner

FILTER ELEMENT UTILIZING SHAPED PARTICLE-CONTAINING NONWOVEN WEB

CROSS REFERENCE TO RELATED APPLICATIONS

This application is a national stage filing under 35 U.S.C. 371 of PCT/US2009/066494, filed Dec. 3, 2009, which claims priority to U.S. Application No. 61/138,750, filed Dec. 18, 2008, the disclosure of which is incorporated by reference in its/their entirety herein.

BACKGROUND

The present disclosure generally relates to filter elements utilizing shaped particle-containing non-woven webs. More particularly, the present disclosure relates to filter elements including shape-retaining self-supporting non-woven webs, wherein the web possesses a three-dimensional deformation. The present disclosure is also directed to respiratory protection systems including such filter elements.

Respiratory protection devices for use in the presence of vapors and other hazardous airborne substances often employ a filtration element containing sorbent particles. Design of such filtration elements may involve a balance of sometimes competing factors such as pressure drop, surge resistance, overall service life, weight, thickness, overall size, resistance to potentially damaging forces such as vibration or abrasion, and sample-to-sample variability. Fibrous webs loaded with sorbent particles often have low pressure drop and other advantages.

Fibrous webs loaded with sorbent particles have been incorporated into cup-like molded respirators. See, e.g., U.S. Pat. No. 3,971,373 to Braun. A typical construction of such a respiratory protection device includes one or more particle-containing and particle-retaining layers placed between a pair of shape retaining layers. See, e.g., U.S. Pat. No. 6,102,039 to Springett et al. The shape-retaining layers provide structural integrity to the otherwise relatively soft intermediate layer, so that the assembly as a whole would retain the cup-like shape.

There remains a need for filtration elements that possess advantageous performance characteristics, structural integrity, simple construction and are easier to manufacture.

SUMMARY

The present disclosure is directed to a filter element utilizing a porous shape-retaining self-supporting non-woven web. The web includes thermoplastic elastomeric polymer fibers and active particles disposed in the fibers and it possesses a three-dimensional deformation. In one implementation, the three-dimensional deformation is characterized by a uniform density along a thickness direction of the web. In another implementation, the three-dimensional deformation is characterized by a thickness that varies by no more than a factor of 5 along at least one direction across the deformation. In yet another implementation, the three-dimensional deformation has a concave surface characterized by a deviation from a planar configuration of at least 0.5 times the web thickness at that location.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. The use of a number to refer to a component in a given figure, however, is not intended to limit the component in another figure labeled with the same number.

DETAILED DESCRIPTION

Figure 1:
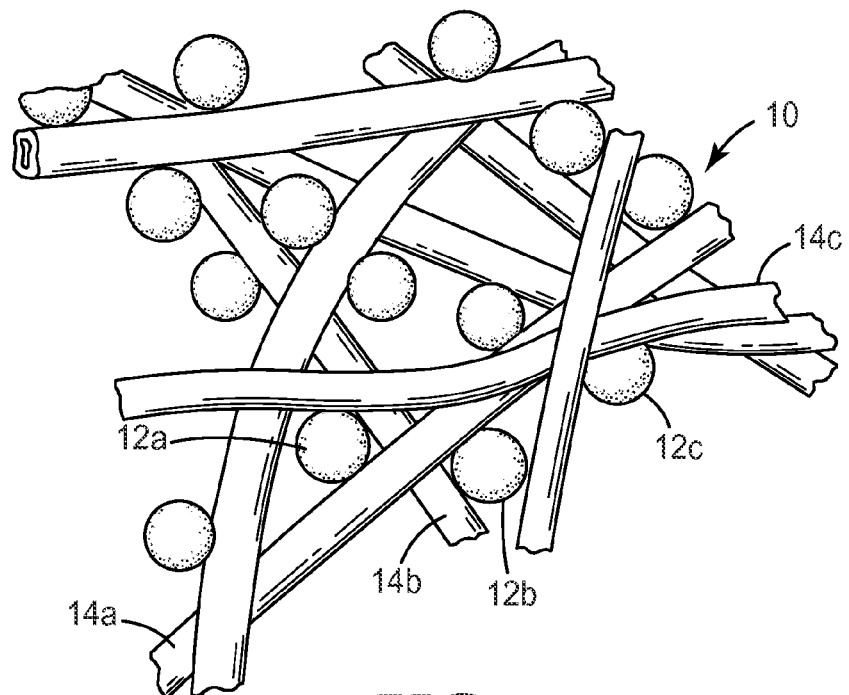
FIG. 1 is a schematic perspective view of a section of a porous non-woven web according to the present disclosure.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Exemplary embodiments of the present disclosure utilize porous shape-retaining self-supporting non-woven webs including thermoplastic elastomeric polymer fibers and active particles enmeshed in the fibers. The webs according to the present disclosure are characterized by a three-dimensional shape or deformation, which may be imparted to the web, e.g., by a molding process.

The present disclosure is expected to facilitate production of shaped molded filter elements for use in respirators with performance and design features that are very difficult to achieve with existing technologies. The primary existing technology for making shaped filter elements, resin bonded carbon particles, involves combining finely ground resin particles with carbon particles and then shaping them under heat and pressure. Such carbon loaded shapes are often used in filter beds. However, this existing technology has various drawbacks. For example, grinding resin into small particles for use in the resin bonding particle process tends to be a relatively expensive procedure. Further, the resin bonding process tends to occlude the surface of the carbon, thereby reducing the activity of the carbon.

In contrast, exemplary filter elements according to the present disclosure are expected to have lower pressure drop due to the use of fibers instead of bonding resin, lower processing cost, and much better retention of the carbon activity. Other advantages of embodiments of the present disclosure include providing an alternative to a filter bed produced using a storm filling process, and the ability to produce complex shapes of filter elements that are difficult to achieve with traditional packed beds.

FIG. 1 shows schematically a section of a porous non-woven web 10 suitable for use in exemplary embodiments of the present disclosure. As used in this specification, the word "porous" refers to an article that is sufficiently permeable to gases so as to be useable in a filter element of a personal respiratory protection device. The phrase "nonwoven web" refers to a fibrous web characterized by entanglement or point bonding of fibers. The porous non-woven web 10 includes active particles 12a, 12b, 12c, disposed in, e.g., enmeshed, in polymer fibers 14a, 14b, 14c. Small, connected pores formed in the non-woven web 10 (e.g., between the polymer fibers and particles) permit ambient air or other fluids to pass through the non-woven web 10. Active particles, e.g., 12a, 12b, 12c, may be capable of absorbing solvents and other potentially hazardous substances present in such fluids. The word "enmeshed" when used with respect to particles in a nonwoven web refers to particles that are sufficiently bonded to or entrapped within the web so as to remain within or on the web when the web is subjected to gentle handling such as draping the web over a horizontal rod. Examples of such porous non-woven webs and methods of making thereof are described, for example, in Pub. No. US 2006/0096911.

Examples of active particles suitable for use in some embodiments of the present disclosure include sorbents, catalysts and chemically reactive substances. A variety of active particles can be employed. In some embodiments, the active particles will be capable of absorbing or adsorbing gases, aerosols or liquids expected to be present under the intended use conditions. The active particles can be in any usable form including beads, flakes, granules or agglomerates. Preferred active particles include activated carbon; alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); nano-sized gold particles; clay and other minerals treated with acidic solutions such as acetic acid or alkaline solutions such as aqueous sodium hydroxide; ion exchange resins; molecular sieves and other zeolites; silica; biocides; fungicides and virucides. Activated carbon and alumina are particularly preferred active particles.

Exemplary catalyst materials include Carulite 300 (also referred to as hopcalite, a combination of copper oxide and manganese dioxide (from MSDS)) which removes carbon monoxide (CO), or catalyst containing nano-sized gold particles, a granular activated carbon coated with titanium dioxide and with nano-sized gold particles disposed on the titanium dioxide layer, (United States Patent Application No. 2004/0095189 A1) which removes CO, OV and other compounds.

Exemplary chemically reactive substances include triethylenediamine, hopcalite, zinc chloride, alumina (for hydrogen fluoride), zeolites, calcium carbonate, and carbon dioxide scrubbers (e.g. lithium hydroxide). Any one or more of such chemically reactive substances may be in the form of particles or they may be supported on particles, typically those with large surface areas, such as activated carbon, alumina or zeolite particles.

More than one type of active particles may be used in the same exemplary porous non-woven web according to the present disclosure. For example, mixtures of active particles can be employed, e.g., to absorb mixtures of gases. The desired active particle size can vary a great deal and usually will be chosen based in part on the intended service conditions. As a general guide, the active particles may vary in size from about 5 to 3000 micrometers average diameter. Preferably the active particles are less than about 1500 micrometers average diameter, more preferably between about 30 and about 800 micrometers average diameter, and most preferably between about 100 and about 300 micrometers average diameter. Mixtures (e.g., bimodal mixtures) of active particles having different size ranges can also be employed. In some embodiments of the present disclosure, more than 60 weight percent active particles are enmeshed in the web. In other embodiments, preferably, at least 80 weight percent active particles, more preferably at least 84 weight percent and most preferably at least 90 weight percent active particles are enmeshed in the web.

Examples of polymer fibers suitable for use in some embodiments of the present disclosure include thermoplastic polymer fibers, and, preferably, thermoplastic elastomeric polymer fibers. A variety of fiber-forming polymeric materials can be suitably employed, including thermoplastics such as polyurethane elastomeric materials (e.g., those available under the trade designations IROGRAN™ from Huntsman LLC and ESTANE™ from Noveon, Inc.), thermoplastic elastomeric polyolefins (such as polymers available from Exxon Mobil Chemical under the trade designation Vistamaxx), polybutylene elastomeric materials (e.g., those available under the trade designation CRASTIN™ from E. I. DuPont de Nemours & Co.), polyester elastomeric materials (e.g., those available under the trade designation HYTREL™ from E. I. DuPont de Nemours & Co.), polyether block copolyamide elastomeric materials (e.g., those available under the trade designation PEBAX™ from Atofina Chemicals, Inc.) and elastomeric styrenic block copolymers (e.g., those available under the trade designations KRATON™ from Kraton Polymers and SOLPRENE™ from Dynasol Elastomers).

Some polymers may be stretched to much more than 125 percent of their initial relaxed length and many of these will recover to substantially their initial relaxed length upon release of the biasing force and this latter class of materials is generally preferred. Thermoplastic polyurethanes, thermoplastic elastomeric polyolefins, polybutylenes and styrenic block copolymers are especially preferred. If desired, a portion of the web can represent other fibers that do not have the recited elasticity or crystallization shrinkage, e.g., fibers of conventional polymers such as polyethylene terephthalate; multicomponent fibers (e.g., core-sheath fibers, splittable or side-by-side bicomponent fibers and so-called "islands in the sea" fibers); staple fibers (e.g., of natural or synthetic materials) and the like. Preferably, however, relatively low amounts of such other fibers are employed so as not to detract unduly from the desired sorbent loading level and finished web properties.

Figure 2:
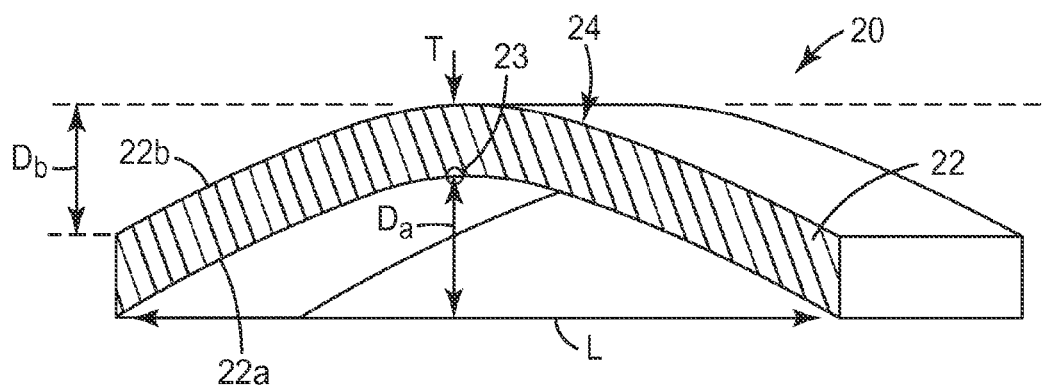
FIG. 2 is a schematic perspective view of a cross-section of one exemplary filter element utilizing a shape-retaining self-supporting non-woven web having a three-dimensional deformation.

FIG. 2 is a schematic perspective view of a cross-section of one exemplary filter element 20 utilizing a shape-retaining self-supporting non-woven web 22, which may be a porous non-woven web 10, as shown in FIG. 1. In the context of the present disclosure, the term "shape-retaining," referring to an article, signifies that the article possesses sufficient resiliency and structural integrity so as to (i) resist deformation when a force is applied or (ii) yield to the deforming force but subsequently substantially return to the original shape upon removal of the deforming force, wherein the amount and type of the deforming force is typical for the ordinary conditions in which the article is intended to be used. The term "self-supporting," referring to an article, signifies that the article possesses sufficient rigidity so as to be capable of retaining a non-planar configuration on its own, that is, in the absence of any additional supporting layers or structures.

Referring further to FIG. 2, the web 22 possesses a three-dimensional deformation 24, which is illustrated in cross-section. Particularly, rather than having a planar configuration, in which major surfaces 22a and 22b of the web 22 would have planar configurations and would be generally parallel to each other, as would be the case for typical non-woven particle-containing webs, the web 22 is shaped, such that at least one of its major surfaces 22a and 22b deviates from a planar configuration. In this exemplary embodiment, the first surface 22a is displaced from a planar configuration by as much as Da, while the second surface 22a is displaced from a planar configuration by as much as Db.

The web 22 is further characterized by a web thickness T, which may be defined as a distance between the first surface 22a and the second surface 22b. Some exemplary dimensions of deformations according to exemplary embodiments of the present disclosure include a web thickness T of 5 to 10 mm or more. The value of T will depend on the intended end use of the filter element and other considerations. The deformation 24 is further characterized by a linear length L, which may be defined as a length of a projection onto a planar surface underlying the deformation 24 of a cross-section of the deformation 24 in a plane that includes the displacement Da.

In some exemplary embodiments, at least one of Da and Db is at least 0.5 times the web thickness T at the web location where the displacement is measured. In the exemplary embodiment shown, thickness T and displacement Da are both measured at a location 23. In other exemplary embodiments, at least one of Da and Db may be at least 1 to 10, 2 to 10, 4 to 10, 5 to 10, or more than times the web thickness T at the web location where the displacement is measured, depending on the intended end use of the filter element or other considerations.

Referring further to FIG. 2, major surface 22a of the web 22 of the exemplary filter element 20 may be characterized as a concave surface, while the major surface 22b may be characterized as a convex surface. In some such exemplary embodiments, the concave surface 22a is characterized by a deviation Da from a planar configuration of at least 0.5 times the web thickness T at the web location where the displacement is measured. In other exemplary embodiments, Da of the surface 22a may be at least 1 to 10, 2 to 10, 4 to 10, 5 to 10, or more than 10 times the web thickness T at the web location where the displacement is measured, depending on the intended end use of the filter element or other considerations.

In some typical exemplary embodiments, the linear deformation length L may be at least 3 to 4, or 3 to 5 times the thickness T. In other exemplary embodiments, the linear deformation length L may be at least 10 to 50, 20 to 50, 30 or more, 40 or more, or 50 or more. Some exemplary absolute values of L include 2 cm, 4 cm or 10 cm or more. The value of L and its ratio to T will depend on various factors, including the end use of the filter element. Those of ordinary skill in the art will readily appreciate that deformations of the web 22 may have any other suitable shape and size, including but not limited to those shown in FIGS. 3-4.

Figure 3:
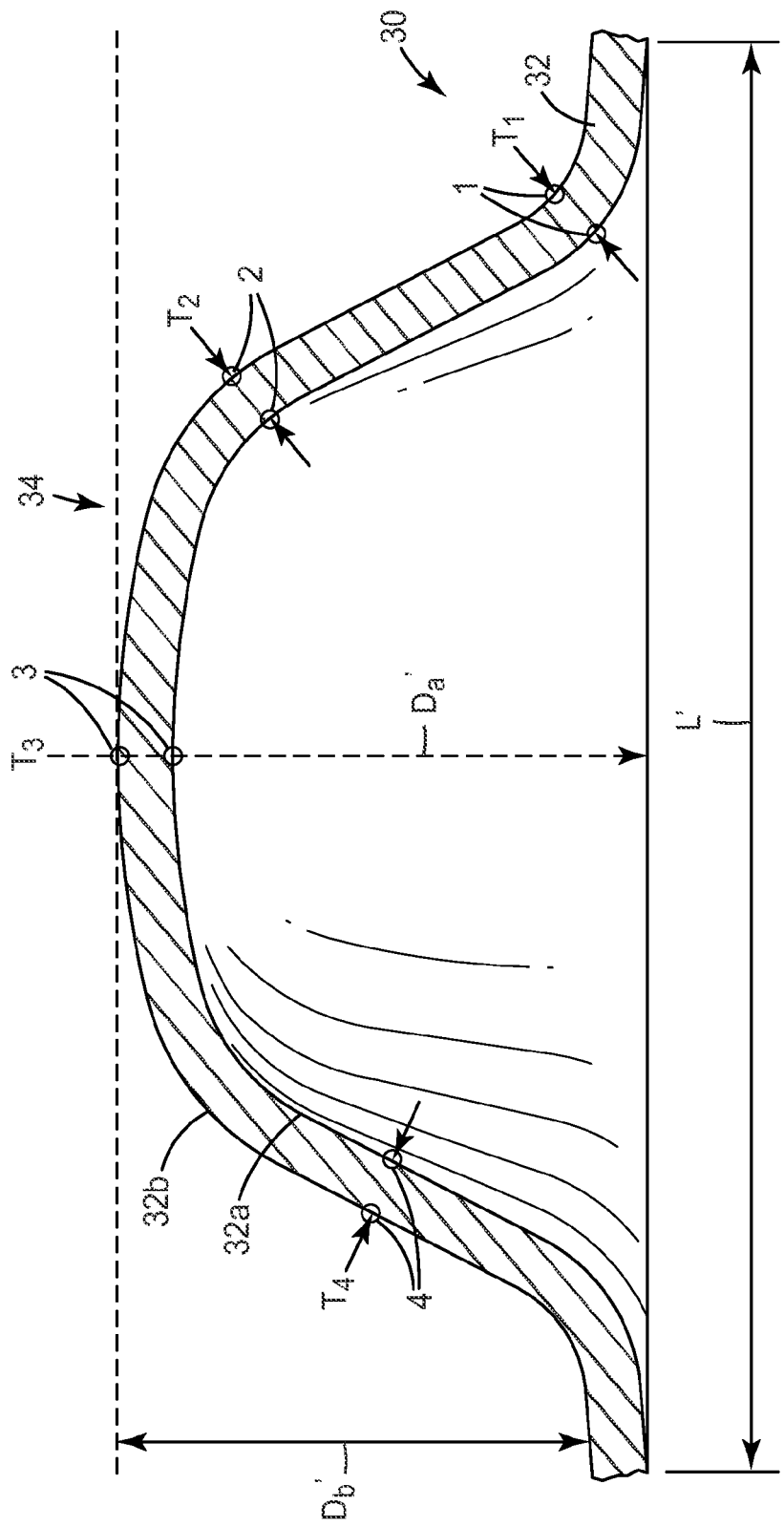
FIG. 3 is a schematic perspective view of a cross-section of another exemplary filter element including a shape-retaining self-supporting non-woven web having a three-dimensional deformation.

FIG. 3 is a schematic perspective view of a cross-section of another exemplary filter element 30 utilizing a shape-retaining self-supporting non-woven web 32. The web 32 possesses a three-dimensional deformation 34. In this exemplary embodiment, the first surface 32a is displaced from a planar configuration by as much as Da', while the second surface 32a is displaced from a planar configuration by as much as Db'. The web 32 is further characterized by variable web thickness T1, T2, T3 and T4, each being defined as a distance between the first surface 32a and the second surface 32b. The deformation 34 is further characterized by a linear length of the line L'. L' is a projection of a cross-section of the deformation 34, in a plane that includes the displacement Da', onto a planar surface underlying the deformation 34.

Preferably, in the embodiments that have a variable web thickness, the thickness varies no more than a factor of 10 times an average thickness Tav, along at least one direction across the deformation 34. More preferably, the thickness varies no more than a factor of 5 times an average thickness Tav, along at least one direction across the deformation 34, and, even more preferably, no more than a factor of 2, 1, and, most preferably, no more than a factor of 0.5. An average thickness may be calculated by choosing a particular direction across the deformation 34, such as along the cross-section of the web 32 and the deformation 34 by the plane of the page of FIG. 3, measuring values of the web thickness, preferably, for at least 4 different locations (e.g., 1, 2, 3 and 4) along the chosen direction (i.e., values of T1, T2, T3 and T4), and averaging these values as follows:

$$Tav = (T1+T2+T3+T4)/4$$

In some exemplary embodiments, the locations 1, 2, 3, and 4 can be selected by dividing L into 5 about equal parts and taking thickness measurements at the 4 internal points.

With further reference to FIG. 3, an exemplary shape-retaining self-supporting non-woven web 32 utilized in an exemplary filter element 30 possesses a three-dimensional deformation 34 that is characterized by a uniform density in a thickness direction of the web. More particularly, in such exemplary embodiments, the web density is considered uniform in the thickness direction if, in cross-section, it exhibits an integral construction having only one, two or more continuous layers, as opposite to a layered structure with two or more layers separated by one or more air gaps.

Some exemplary embodiments of the web 32 the three-dimensional deformation 34 may be characterized by a density gradient that has a relatively small value. In one exemplary embodiment, the three-dimensional deformation 34 is characterized by a density gradient of less than 20 to 1. In other exemplary embodiments, the three-dimensional deformation 34 may be characterized by a density gradient of less than 10 to 1, 3 to 1, or 2 to 1.

The density gradient can be determined as follows. Two samples are taken from two different locations of the three-dimensional deformation 34 of the web 32, such as any two of the locations 1, 2, 3 and 4 shown in FIG. 3. Densities δ1 and δ2 can then be determined using the procedure described below and density gradient δg determined as a ratio of a larger density value δ2 to a smaller density value δ1.

Figure 4:
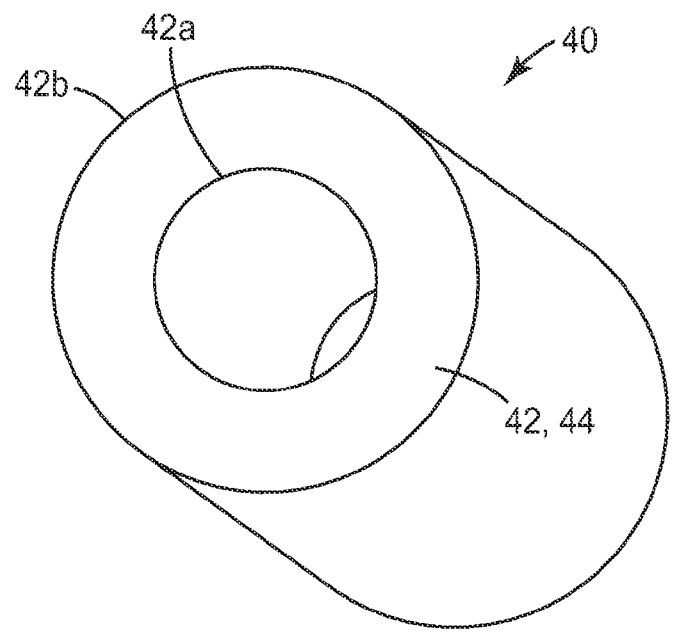
FIG. 4 is a schematic perspective view of a cross-section of another exemplary filter element including a shape-retaining self-supporting non-woven web having a three-dimensional deformation.

FIG. 4 is a schematic perspective view of another exemplary filter element 40 utilizing a shape-retaining self-supporting non-woven web 42. The web 42 possesses a three-dimensional deformation 44. In this exemplary embodiment, the first surface 42a and the second surface 42b of the web 42 is displaced from a planar configuration such that the web 42 forms a generally cylindrical shape. Such exemplary filter elements are particularly advantageous for use in respiratory protection devices designed for use against mixed gas challenges, e.g. ammonia and organic vapor.

Figure 5:
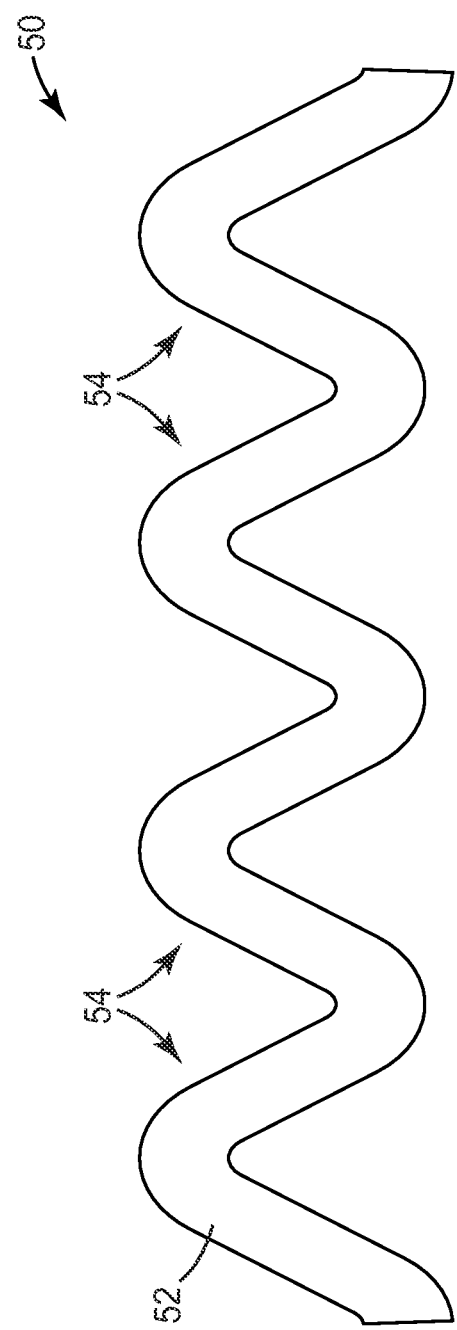
FIG. 5 is a schematic view of a cross-section of another exemplary filter element including a shape-retaining self-supporting non-woven web having two or more three-dimensional deformations.

FIG. 5 is a cross-sectional view of another exemplary filter element 50 utilizing a porous non-woven web 52, such as webs described in connection with other exemplary embodiments of the present disclosure. The web 52 possesses two or more three-dimensional deformations 54. In this exemplary embodiment, the first surface 52a and the second surface 52b of the web 52 is displaced from a planar configuration such that the web 52 forms a series of three-dimensional deformations. In the embodiment shown, the deformations 54 form a linear array (the deformations 54 form a repeating sequence along one direction). In other exemplary embodiments, the deformations 54 form a two-dimensional array (the deformations 54 form a repeating sequence along two different directions). In other exemplary embodiments, the deformations 54 may form any type of a distribution, such as a random array. The individual deformations may be similar in size and/or shape or they may be different from each other.

Figure 6:
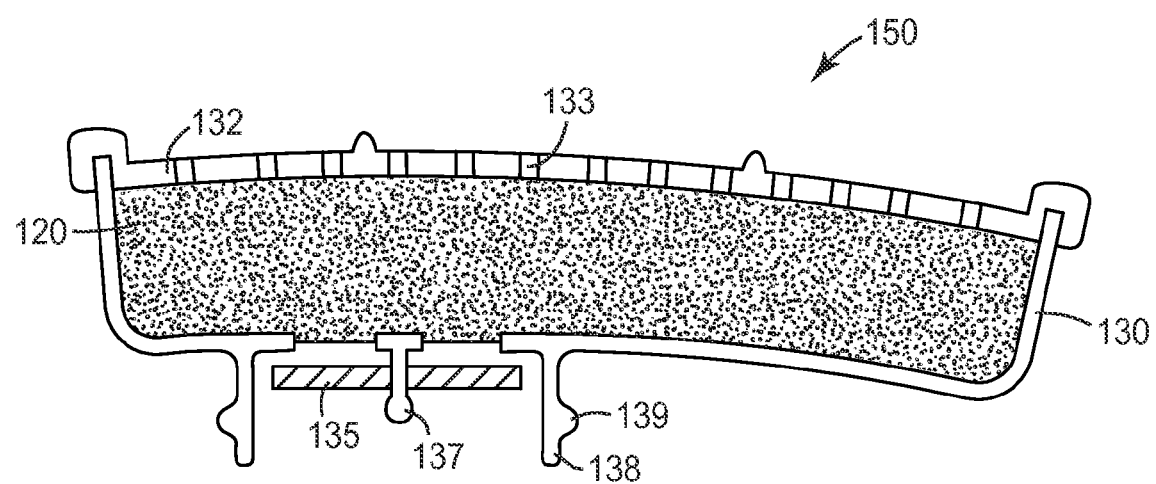
FIG. 6 is a schematic cross-sectional view of an exemplary filter element according to the present disclosure that is disposed in a cartridge.

FIG. 6 shows a schematic cross-sectional view of another exemplary filter element 150 according to the present disclosure. The exemplary filter element 150 includes a housing 130. A shape-retaining self-supporting non-woven web 120 constructed according to the present disclosure, such as the exemplary web shown in FIG. 2, is disposed in the interior of the housing 130. The housing 130 includes a cover 132 having openings 133. Ambient air enters the filter element 150 through the openings 133, passes through the web 120 (whereupon potentially hazardous substances in such ambient air are processed by active particles in the web 120) and exits the housing 130 past an intake air valve 135 mounted on a support 137.

Figure 7:
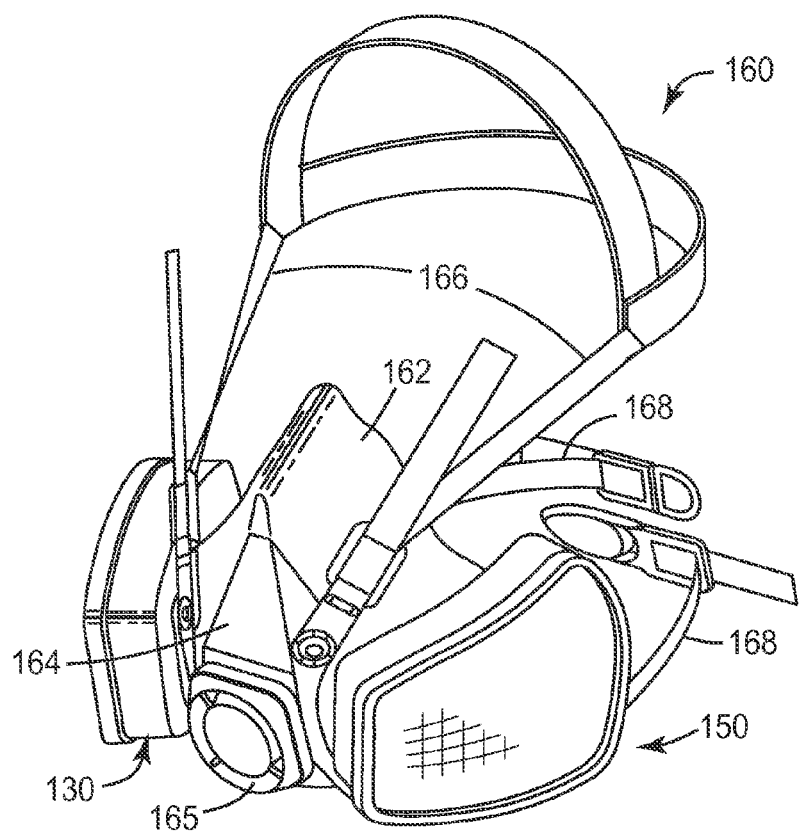
FIG. 7 is a perspective view of an exemplary respiratory protection system utilizing a filter element shown in FIG. 6.

A spigot 138 and bayonet flange 139 enable filter element 150 to be replaceably attached to a respiratory protection device 160, shown in FIG. 7. Device 160, which is sometimes referred to as a half mask respirator, includes a compliant face piece 162 that can be insert molded around relatively thin, rigid structural member or insert 164. Insert 164 includes exhalation valve 165 and recessed bayonet-threaded openings (not shown in FIG. 7) for removably attaching housings 130 of filter elements 150 in the cheek regions of device 160. Adjustable headband 166 and neck straps 168 permit device 160 to be securely worn over the nose and mouth of a wearer. Further details regarding the construction of such a device will be familiar to those skilled in the art.

Figure 8:
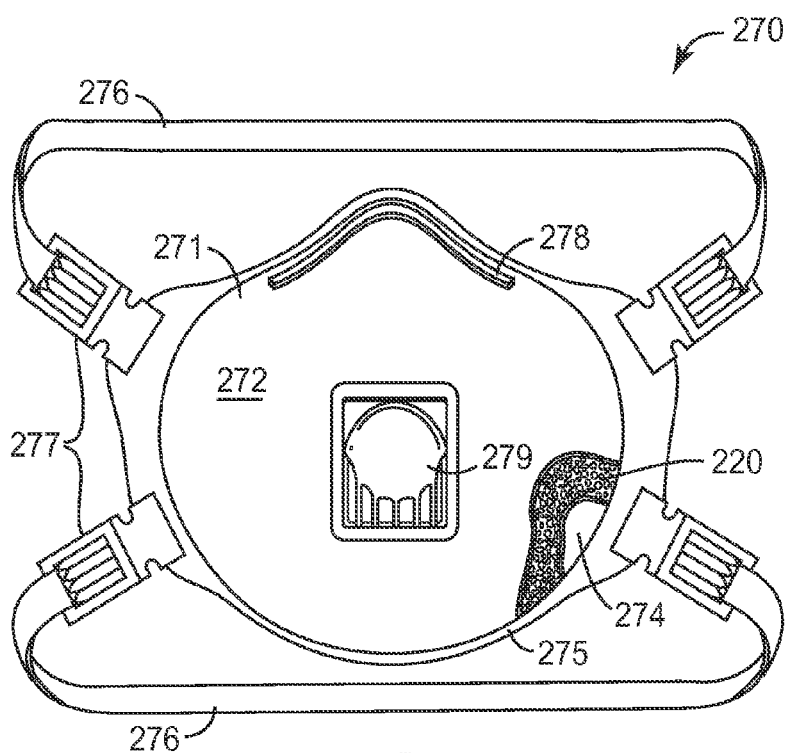
FIG. 8 is a perspective view, partially cut away, of a disposable respiratory protection device utilizing an exemplary filter element according to the present disclosure shown in FIG. 3.

FIG. 8 shows another exemplary respiratory protection device 270, in which exemplary embodiments of the present disclosure may find use. Device 270 is sometimes referred to as a disposable or maintenance free mask, and it has a generally cup-shaped shell or respirator body 271 including an outer cover web 272, a shape-retaining self-supporting non-woven web 220 constructed according to the present disclosure, such as exemplary webs shown in FIGS. 2 and 3, and an inner cover web 274. Welded edge 275 holds these layers together and provides a face seal region to reduce leakage past the edge of the device 270. Device 270 includes adjustable head and neck straps 276 fastened to the device 270 by tabs 277, a nose band 278 and an exhalation valve 279. Further details regarding the construction of such a device will be familiar to those skilled in the art.

Figure 9:
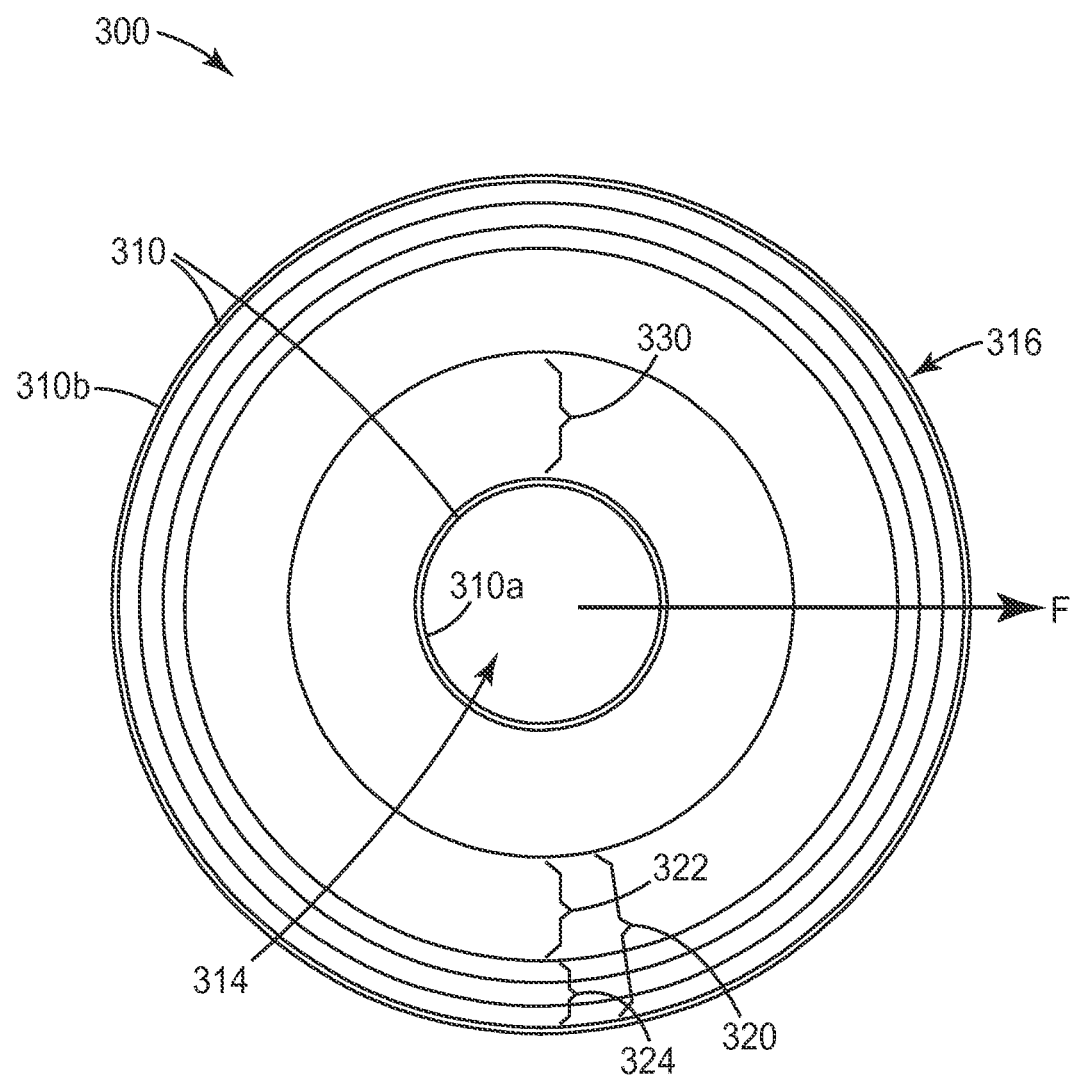
FIG. 9 is a cross-sectional view of a radial filtration system, such as those suitable for use in collective protection systems, utilizing an exemplary filter element according to the present disclosure shown in FIG. 4.

FIG. 9 shows another exemplary respiratory protection device 300, in which exemplary embodiments of the present disclosure may find use, particularly, exemplary embodiments illustrated in FIG. 4. Device 300 is sometimes referred to as a radial flow filtering system, such as those used in air handling systems for collective protection. In the illustrated embodiment, the inlet 314 is located at the inner periphery 310a of the housing 310. The outlet 316, which is in fluid communication with the inlet 314, may be located at the outer periphery 310b of the housing 310. An exemplary filter element 320 disposed within the interior of the housing includes a porous non-woven web 322 according to the present disclosure and three layers of a porous non-woven web 324 according to the present disclosure.

The web 322 may include materials that are different from one or more of the layers of the web 324 and/or it may have different filtration properties than one or more of the layers of the web 324. In some exemplary embodiments, a layer of the web 324 may include materials that are different from a material of one or more of the other layers of the web 324 and/or it may have different filtration properties than one or more of the layers of the web 324. An additional filter element, such as a particulate filter element 330, may also be provided in the interior of the housing 310. A particulate filter element is preferably provided upstream from the filter element 320.

In one embodiment, the air or another fluid is routed to the inlet 314 located in the inner periphery of the housing 310. The air then may pass through each of the filter elements as shown by the arrow F until it passes through the outlet 316. The present disclosure may also be used in other fluid handling systems, and embodiments of the present disclosure may have different configurations and locations of the inlet 314 and outlet 316. For example, the locations of the inlet and outlet may be reversed.

Figure 10:
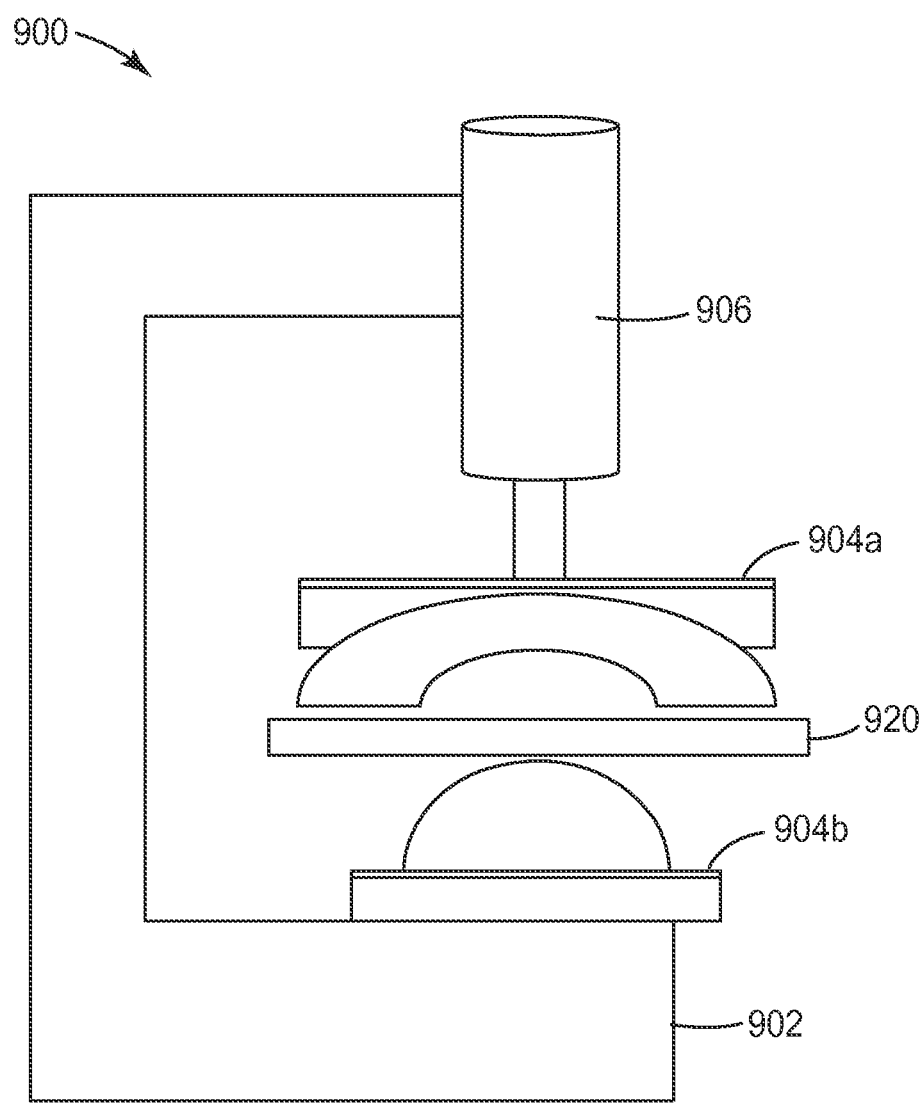
FIG. 10 illustrates an exemplary method of making shape-retaining self-supporting non-woven webs having a three-dimensional deformation, according to the present disclosure.

FIG. 10 illustrates an exemplary method and apparatus 900 for making shape-retaining self-supporting non-woven webs having a three-dimensional deformation, according to the present disclosure. A particle-containing web 920 may originally have a planar configuration. A three-dimensional deformation according to the present disclosure may be imparted to the web 920, for example, by molding the web 920 using an exemplary apparatus 900. The apparatus 900 includes a first temperature controlled mold 904a and a second temperature controlled mold 904b. The shapes of the molds depend on the shape of the deformation desired to be imparted to the web 902. An air actuator piston 906 may be used to control the movement of the first mold 904a toward the second mold 904b. A frame 902 supports the molds 904a, 904b and the piston 906.

In an exemplary method of making a shape-retaining self-supporting non-woven webs having a three-dimensional deformation, the web 920 is placed between the molds 904a and 904b, the molds are brought together such that they subject the web 920 to pressure and heat such that the web 920 is molded to a desired shape. Temperatures of the molds 904a and 904b can be similar or different and are expected to be dependent on the polymer(s) used in the fibers of the web 920. If ExxonMobil Vistamaxx brand 2125 thermoplastic polyolefin elastomer is used for the fibers of the web 902, mold temperatures that are expected to work would be 75 C to 250 C, and, more preferably, 95 C to 120 C. Pressures exerted by the molds 904a and 904b on the web 920 are expected to be dependent on the polymer(s) used in the fibers of the web 920 and may also depend on the type and amount of the active particles. For example, if ExxonMobil Vistamaxx brand 2125 resin is used for the fibers of the web 902, pressures that are expected to work would be 20 $gr/cm^2$ to 10000 $gr/cm^2$, and more preferably 300 to 2000 gr/cm2. Exemplary molding times under such conditions are expected to be 2 seconds to 30 minutes. Generally, molding times will depend on temperatures, pressures and polymers and active particles.

The molding process is believed to soften and form thermoplastic elastomeric polymer fibers of the web, such that the resultant web having a three-dimensional deformation of a desired shape is then capable of being self-supporting and shape-retaining. Other exemplary methods may include molding the web 920 on or in a press with heated platens or by placing fixtures with weights in an oven.

Test Methods

In order to calculate the density of a sample of a filter element according to the present disclosure, one would typically begin by acquiring a relatively undamaged and a reasonably characteristic piece of the filter element. This can be accomplished, for example, by cutting a piece out of the sample under study, preferably such that at least a portion of the three-dimensional deformation according to the present disclosure is included into the sample. It is important that the piece be large enough in all dimensions that it be considered "characteristic." More particularly, the sample must be much larger than the active particles dispersed in the web, and, preferably, at least 5 times the largest dimension of the particulate in the web, and, more preferably, at least 100 times the largest dimension of the particulate in the web.

The sample shape may be chosen such that it would be easy to measure the dimensions and calculate the volume, such as rectangular or cylindrical. In the case of curved surfaces, it may be advantageous to allow the device (rule die) used to cut the sample to define the diameter, e.g. a rule die. In order to measure the dimensions of such a sample one can use ASTM D1777-96 test option #5 as a guide. The presser foot size will have to be adjusted to accommodate the available sample size. It is desirable not to deform the sample during the measuring process, but higher pressure than specified in option #5 may be acceptable under some circumstances. Because the structures to be measured are porous, contact should be spread over an area that is relatively large with respect to a single active particle. After the volume of the characteristic piece is determined, one should weigh the characteristic piece. The density is determined by dividing the weight by the volume.

It is also possible to characterize density of exemplary embodiments of the present disclosure by comparing the density of the particulate component in the non-woven web to that of a "packed bed" of the same particulate material. This would involve removing the particulate from a known volume of the "characteristic piece" and weighing that resulting particulate sample. This particulate could then be poured into a graduated cylinder in order to get its "packed bed" volume. From these data one can calculate the "packed or apparent" density by dividing the weight by the measured volume. However, the result may be skewed by residual polymer adhering to the particulate.

Example

The following layers were assembled and molded into a filtering facepiece respirator shape (resembling a cup) according to the methods of the present disclosure:

1. Outer shell: a layer of non woven material layer—20% Kosa Co. Type 295 1.5 inch cut 6 denier polyester staple fibers and 80% Kosa Co. Type 254 1.5 inch cut, 4 denier bico-polyester staple fibers.
2. A layer of blown microfiber filter medium.
3. A layer of 4000 gsm (gram per square meter) porous non-woven web according to the present disclosure, including 12×20 organic vapor activated carbon particles Type GG, available from Kuraray, enmeshed in thermoplastic elastomeric polyolefin fibers.
4. A layer of 600 gsm porous non-woven web according to the present disclosure including 40×140 organic vapor activated carbon particles enmeshed in thermoplastic elastomeric polyolefin polymer fibers.
5. A layer of dense melt-blown microfiber smooth non woven web.
6. Inner shell: a layer of non woven material layer—20% Kosa Co. Type 295 1.5 inch cut, 6 denier polyester staple fibers and 80% Kosa Co. Type 254 1.5 inch cut, 4 denier bico-polyester staple fibers.

The above layers were put into a molding apparatus intended to mold filtering face piece respirators. The top mold was set at the temperature of 235 F, while the bottom mold was set at the temperature of 300 F.

The pressure drop of the respirator constructions thus formed, when measured at 85 l/m, was between 14.9 mm water and 33.7 mm water. When tested against the CEN test method for cyclohexane (Test Conditions: 1000 ppm, 30 lpm, 20 C, 70% RH, 10 ppm breakthrough), the molded respirator construction had a service life of 40-59 minutes. A pertinent CEN test is described in British Standard BS EN141:200 "Respiratory protective devices—Gas filters and combined filters—Requirements, testing, marking."

Thus, embodiments of the FILTER ELEMENT UTILIZING SHAPED PARTICLE CONTAINING NONWOVEN WEB are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. A filter element comprising:
a porous shape-retaining self-supporting non-woven web, the web comprising thermoplastic elastomeric polymer fibers and active particles disposed in the fibers;
wherein the web possesses a three-dimensional deformation characterized by a uniform density along a thickness direction of the web.

2. The filter element of claim 1, wherein the deformation comprises a surface feature characterized by a displacement from a planar configuration of at least 0.5 times the web thickness.

3. The filter element of claim 1, wherein the web thickness varies no more than 2 times the web thickness along at least one direction across the deformation.

4. The filter element of claim 1, wherein the three-dimensional deformation is characterized by a density gradient of less than 20 to 1.

5. The filter element of claim 4, wherein three-dimensional deformation is characterized by a density gradient of less than 10 to 1.

6. The filter element of claim 1, wherein the:
deformation is characterized by a thickness that varies by no more than a factor of 5 along at least one direction across the deformation.

7. The filter element of claim 1, wherein:
the deformation comprises a concave surface characterized by a deviation from a planar configuration of at least 0.5 times the web thickness at that location.

8. The filter element of claim 7, wherein the concave surface is characterized by a deviation of at least 1 times the web thickness from the planar configuration.

9. The filter element of claim 7, wherein the concave surface is characterized by a deviation of at least 5 times the web thickness from a planar configuration.

10. The filter element of claim 1, wherein the web is characterized by a density of at least 30% of a density of a packed bed made with similar active particles.

11. The filter element of claim 1, wherein the web comprises more than 60 weight percent sorbent particles enmeshed in the web.

12. The filter element of claim 1, wherein the web comprises at least 80 weight percent sorbent particles enmeshed in the web.

13. The filter element of claim 1, wherein the fibers comprise at least one of: a thermoplastic polyurethane elastomer, a thermoplastic polybutylene elastomer, a thermoplastic polyester elastomer, thermoplastic elastomeric polyolefin, and a thermoplastic styrenic block copolymer.

14. An article according to claim 1, wherein the active particles comprise at least one of: a sorbent, a catalyst and a chemically reactive substance.

15. A respiratory protection system comprising:
an interior portion that generally encloses at least the nose and mouth of a wearer;
an air intake path for supplying ambient air to the interior portion; and
a filter element disposed across the air intake path to filter such supplied air, the filter element comprising:
a porous shape-retaining self-supporting non-woven web, the web comprising thermoplastic elastomeric polymer fibers and active particles disposed in the fibers;
wherein the web possesses a three-dimensional deformation characterized by a uniform density along a thickness direction of the web.

16. The respiratory protection system of claim 15, wherein the respiratory protection system is a maintenance free respirator.

17. The respiratory protection system of claim 15, wherein the respiratory protection system is a powered air purifying respirator.

* * * * *